(12) United States Patent
Baldwin et al.

(10) Patent No.: US 8,779,288 B1
(45) Date of Patent: Jul. 15, 2014

(54) ELECTRICAL DEVICE COVER WITH KEYHOLES AND ADAPTERS

(75) Inventors: Jeffrey P. Baldwin, Phoenix, AZ (US);
Marcus J. Shotey, Scottsdale, AZ (US);
Samuel Dumpe, Beaver, PA (US); Jason Thomas, Mesa, AZ (US); Ryan K. Liebengood, Mesa, AZ (US)

(73) Assignee: Hubbell Incorporated, Shelton, CT (US)

( * ) Notice: Subject to any disclaimer, the term of this patent is extended or adjusted under 35 U.S.C. 154(b) by 161 days.

(21) Appl. No.: 13/445,828

(22) Filed: Apr. 12, 2012

Related U.S. Application Data

(60) Provisional application No. 61/474,716, filed on Apr. 12, 2011.

(51) Int. Cl.
*H02G 3/04* (2006.01)
*H02G 3/14* (2006.01)
*H02G 3/08* (2006.01)

(52) U.S. Cl.
CPC . *H02G 3/14* (2013.01); *H02G 3/081* (2013.01)
USPC .............. 174/66; 174/67; 174/53; 220/241; 220/242

(58) Field of Classification Search
CPC ......... H02G 3/14; H02G 3/081; H02G 3/085; H02G 3/10; H02G 3/088
USPC ........................... 174/66, 67, 53, 57, 58, 559; 220/3.2–3.9, 4.02, 241, 242; 439/535, 439/536; D13/177; 200/333
See application file for complete search history.

(56) References Cited

U.S. PATENT DOCUMENTS

| | | |
|---|---|---|
| 872,694 A | 12/1907 | Thiem |
| 946,646 A | 1/1910 | Pratt |
| 1,228,731 A | 6/1917 | Abbott et al. |
| 1,557,526 A | 6/1921 | Hartmann |
| 1,608,621 A | 11/1926 | Sachs |
| 1,784,277 A | 12/1930 | Darlington |
| 1,952,719 A | 3/1934 | Lewin |
| 2,240,187 A | 4/1941 | Kingdon et al. |
| 2,321,640 A | 6/1943 | Adkins |
| 2,596,236 A | 5/1952 | Glosier |
| 2,916,733 A | 12/1959 | Hirsch |
| 3,104,774 A | 9/1963 | Hudson et al. |
| 3,252,611 A | 5/1966 | Weitzman et al. |
| 3,432,611 A | 3/1969 | Gaines et al. |
| 3,437,738 A | 4/1969 | Wagner |
| 3,438,534 A | 4/1969 | Zerwes |
| 3,491,327 A | 1/1970 | Tait et al. |
| 3,518,356 A | 6/1970 | Friedman |
| 3,525,450 A | 8/1970 | Payson |

(Continued)

*Primary Examiner* — Angel R Estrada
(74) *Attorney, Agent, or Firm* — Mark S. Bicks; Alfred N. Goodman

(57) ABSTRACT

A cover base for an electrical device is disclosed. The cover base includes a base portion with a front surface and a back surface, the base portion also having a first opening extending through the base portion from the front surface to the back surface, the first opening having a size larger than an electrical device face; and an adapter having a second opening sized and configured to receive the electrical device face therein, wherein the adapter is configured to fit within the first opening in the base portion to removably couple to the base portion. Numerous electrical device cover bases including keyholes formed in either the base or the adapter, or both, depending on the arrangement are disclosed.

26 Claims, 14 Drawing Sheets

(56) References Cited

U.S. PATENT DOCUMENTS

| | | |
|---|---|---|
| 3,530,230 A | 9/1970 | Cormier et al. |
| 3,544,703 A | 12/1970 | Jones |
| 3,564,112 A | 2/1971 | Algotsson |
| 3,690,035 A | 9/1972 | Schindlauer |
| 3,895,179 A | 7/1975 | Wyatt |
| 3,965,287 A | 6/1976 | Mueller |
| 4,032,030 A | 6/1977 | Bass et al. |
| 4,197,959 A | 4/1980 | Kramer |
| 4,342,493 A | 8/1982 | Grenell |
| 4,424,407 A | 1/1984 | Barbic |
| 4,500,746 A | 2/1985 | Meehan |
| 4,737,599 A | 4/1988 | Fontaine |
| 4,757,908 A | 7/1988 | Medlin, Sr. |
| 4,833,277 A | 5/1989 | Jacoby, Jr. et al. |
| 4,844,275 A | 7/1989 | Schnell et al. |
| 4,998,635 A | 3/1991 | Vink et al. |
| 5,072,848 A | 12/1991 | Pipis et al. |
| 5,076,641 A | 12/1991 | Lindberg |
| 5,161,983 A | 11/1992 | Ohno et al. |
| 5,178,350 A | 1/1993 | Vink et al. |
| 5,280,135 A | 1/1994 | Berlin et al. |
| 5,317,108 A | 5/1994 | Prairie, Jr. |
| D350,530 S | 9/1994 | Comerci et al. |
| 5,362,924 A | 11/1994 | Correnti |
| 5,456,373 A | 10/1995 | Ford |
| 5,486,650 A | 1/1996 | Yetter |
| 5,556,289 A | 9/1996 | Holbrook, Jr. |
| 5,594,205 A | 1/1997 | Cancellieri et al. |
| 5,651,696 A | 7/1997 | Jennison |
| 5,731,544 A | 3/1998 | Burck et al. |
| 5,763,831 A | 6/1998 | Shotey et al. |
| 5,779,083 A | 7/1998 | Bordwell |
| 6,066,805 A | 5/2000 | Bordwell et al. |
| 6,133,531 A | 10/2000 | Hayduke et al. |
| 6,222,123 B1 | 4/2001 | Schwarz |
| 6,420,653 B1 | 7/2002 | Shotey et al. |
| 6,420,654 B1 | 7/2002 | Shotey et al. |
| 6,437,242 B1 | 8/2002 | Radosavljevic et al. |
| 6,441,307 B1 | 8/2002 | Shotey et al. |
| 6,476,321 B1 | 11/2002 | Shotey et al. |
| 6,924,433 B2 | 8/2005 | Shotey et al. |
| 7,119,277 B1 | 10/2006 | Shotey et al. |
| 7,799,993 B2 * | 9/2010 | Drane et al. .................. 174/67 |

* cited by examiner

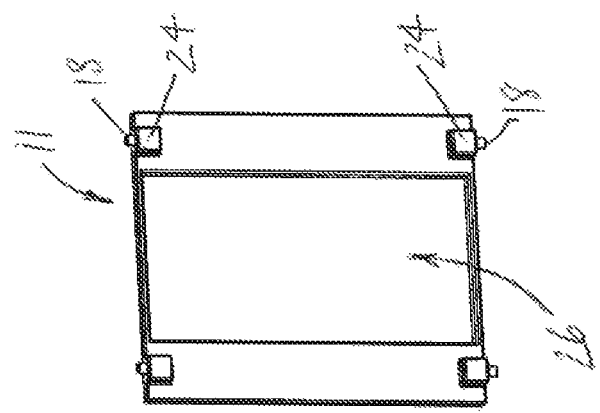
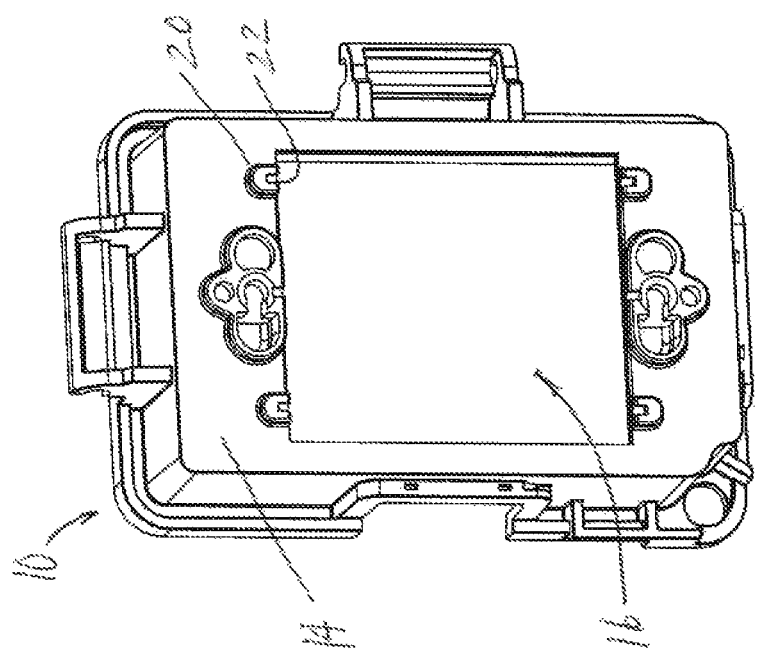
FIG. 4

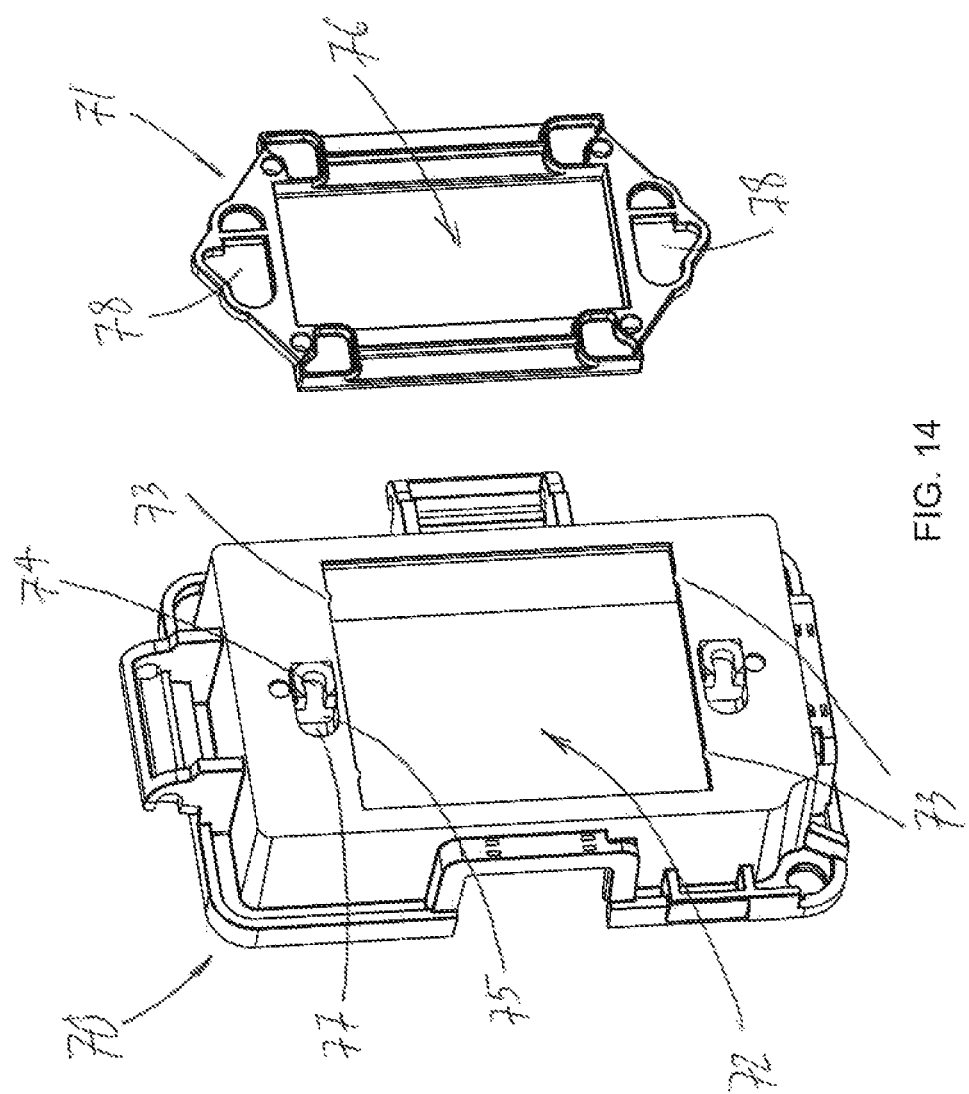

ELECTRICAL DEVICE COVER WITH KEYHOLES AND ADAPTERS

CROSS REFERENCE TO RELATED APPLICATIONS

This Application claims the benefit of the filing date of U.S. Provisional Patent Application 61/474,716 to Baldwin et al. entitled "Electrical Device Cover with Keyholes" which was filed on Apr. 12, 2011, the disclosure of which is hereby incorporated herein by reference.

BACKGROUND OF THE INVENTION

1. Technical Field

Aspects of the present disclosure relate to electrical outlets and receptacles, and more specifically to covers for such outlets and receptacles, and related components and methods.

2. Background Art

Electrical outlets traditionally have included an assembly of components that include the electrical receptacle, a box into which the receptacle is mounted, and a cover. Traditional cover plates typically cover the electrical outlet, except for the socket face or faces, at which the socket faces of the receptacle contact the plug. Such traditional cover plates commonly are mounted to the receptacle using a cover plate mounting screw located substantially in the center of the receptacle and cover plate.

In some instances, it is desirable to have a base position around the receptacle, or specifically around the socket face or faces, for example, to which a cover or cover plate may be attached. In recent years, for example, it has become desirable, particularly for exterior or outdoor applications, to have a receptacle cover that covers the entire receptacle, including the socket faces, so that water and other liquids cannot contact the interface at which the plug contacts the socket face or faces when the outlet is in use.

While the advent of weatherproof covers and particularly in-use weatherproof covers prevent moisture from entering the electrical device, any openings within the electrical device covers provide the potential for water to enter the electrical box and create an electrical short.

SUMMARY

This disclosure includes one or more covers with keyholes and adapters for electrical devices.

Electrical device covers are known to include both a base and a cover wherein the cover is pivotably mounted to the base. A number of electrical device covers include keyholes mounted within the electrical device cover in either the base or an adapter, depending on the arrangement.

A particular aspect broadly includes a cover base for an electrical device, the cover base may include a base portion having a front surface and a back surface. The base portion may further include a first opening extending through the base portion from the front surface to the back surface, the first opening having a size larger than an electrical device face. The cover base may also include an adapter having a second opening sized and configured to receive the electrical device face therein, wherein the adapter is configured to fit within the first opening in the base portion to removably couple to the base portion.

In a particular implementation, the base portion may also include at least one node having a slot located on the back surface of the base portion and wherein the adapter includes at least one tab configured to respectively couple with the slot on the base portion.

In a particular implementation, the adapter may also have a detachable portion. The detachable portion may be shaped when detached to create a shaped aperture configured to receive a correspondingly shaped electrical device.

The base portion may also include a first peripheral side having at least one hinge member thereon.

The base portion may be a single molded piece. It may also be composed of a rigid plastic. The adapter may also be composed of a rigid plastic.

In particular implementations, the adapter may include a mounting aperture and the base portion may include an alignment aperture wherein the mounting aperture and the alignment aperture form a keyhole when the adapter is coupled to the base portion. The base portion may also include a keyhole cover arranged on the front surface of the base portion, and wherein the keyhole cover is configured to cover the alignment aperture of the adapter.

In a particular implementation, the base portion may further include at least one protrusion extending into the first opening.

In a particular implementation, the base portion may include a keyhole cover.

In a particular implementation, the adapter may include at least one keyhole. The adapter may also have a keyhole cover disposed over at least a portion of the keyhole.

In a particular implementation, the adapter may include a lower portion of a keyhole and the base portion may include an upper portion of a keyhole wherein the lower portion of the keyhole and the upper portion of the keyhole may form a keyhole when the adapter is coupled to the base portion.

In another implementation, the adapter may also include a portion of a keyhole and the base portion may include a complementary portion of the keyhole wherein the portion of the keyhole of the adapter and the complementary portion of the keyhole of the base portion may form the keyhole when the adapter is coupled to the base portion.

A particular aspect may broadly include a cover base for an electrical device, the cover base including a base portion with a front surface and a back surface. The base portion may include a first opening extending through the base portion from the front surface to the back surface, the opening having a size larger than an electrical device face. The cover base may also include an adapter having a second opening sized and configured to receive a portion of the electrical device face therein, wherein the adapter may be configured to fit within the opening in the base portion to removably couple to the base portion and wherein the first opening of the base portion the second opening of the adapter and form a third opening sized and configured to receive the electrical device face therein.

Another particular aspect may broadly include a cover base for an electrical device, the cover base including a base portion having a front surface and a back surface, the base portion including a first opening extending through the base portion from the front surface to the back surface, the first opening having a size larger than an electrical device face. The cover base may also include an adapter having a second opening sized and configured to receive an electrical device face therein, wherein a first portion of the adapter may be configured to fit within the first opening in the base portion and a second portion of the adapter may be configured to extend beyond the first opening in the base portion and removably couple to the back surface of the base portion.

A particular aspect may include a method of forming a cover base for an electrical device, the method including providing a base portion having a front surface and a back surface, the base portion further including a first opening extending through the base portion from the front surface to the back surface, the opening having a size larger than an electrical device face; providing an adapter having a second opening sized and configured to receive a portion of the electrical device face therein, positioning the adapter to fit within the first opening in the base portion; removably coupling the adapter to the base portion; and forming a third opening with the first opening of the base portion the second opening of the adapter wherein the third opening is sized and configured to receive the electrical device face therein.

Another particular aspect may include a method of forming a cover base for an electrical device, the method including providing a base portion having a front surface and a back surface, the base portion further including a first opening extending through the base portion from the front surface to the back surface, the opening having a size larger than an electrical device face, providing an adapter having a second opening sized and configured to receive an electrical device face therein, positioning the adapter to fit within the first opening in the base portion, and removably coupling the adapter to the base portion.

In particular implementations, the adapter may include an extended portion and the method may also include removably coupling the extended portion to the back surface of the base portion.

BRIEF DESCRIPTION OF THE DRAWINGS

Features of particular embodiments and implementations of covers for an electrical devices will hereinafter be described in conjunction with the appended drawings, where like designations denote like elements, and:

FIG. 4 is an exploded perspective view of the electrical device cover of FIG. 3;

FIG. 14 is an exploded perspective view of the electrical device cover of FIG. 13.

DETAILED DESCRIPTION

Accordingly, there are a variety of electrical device covers with keyholes including a base which can incorporate adapters.

Electrical device covers are known to include both a base and a cover wherein the cover is pivotably mounted to the base. A number of electrical device covers include keyholes mounted within the electrical device cover in either the base or an adapter, or a combination of both, depending on the arrangement.

FIGS. 1 through 14 illustrate various aspects and implementations of an electrical outlet cover with keyholes having a base and an adapter. While a wide variety of aspects are shown and described, repetitive numbering of common elements has been omitted. Further, an electrical device, a socket device face, and an electrical device cover have been omitted from the drawings as one of ordinary skill in the art will immediately understand the interaction of the elements omitted from the drawings with the base and/or the adapter. In particular implementations disclosed herein, an adapter is configured to fit into the base instead of on the back of the base.

Figure 1:
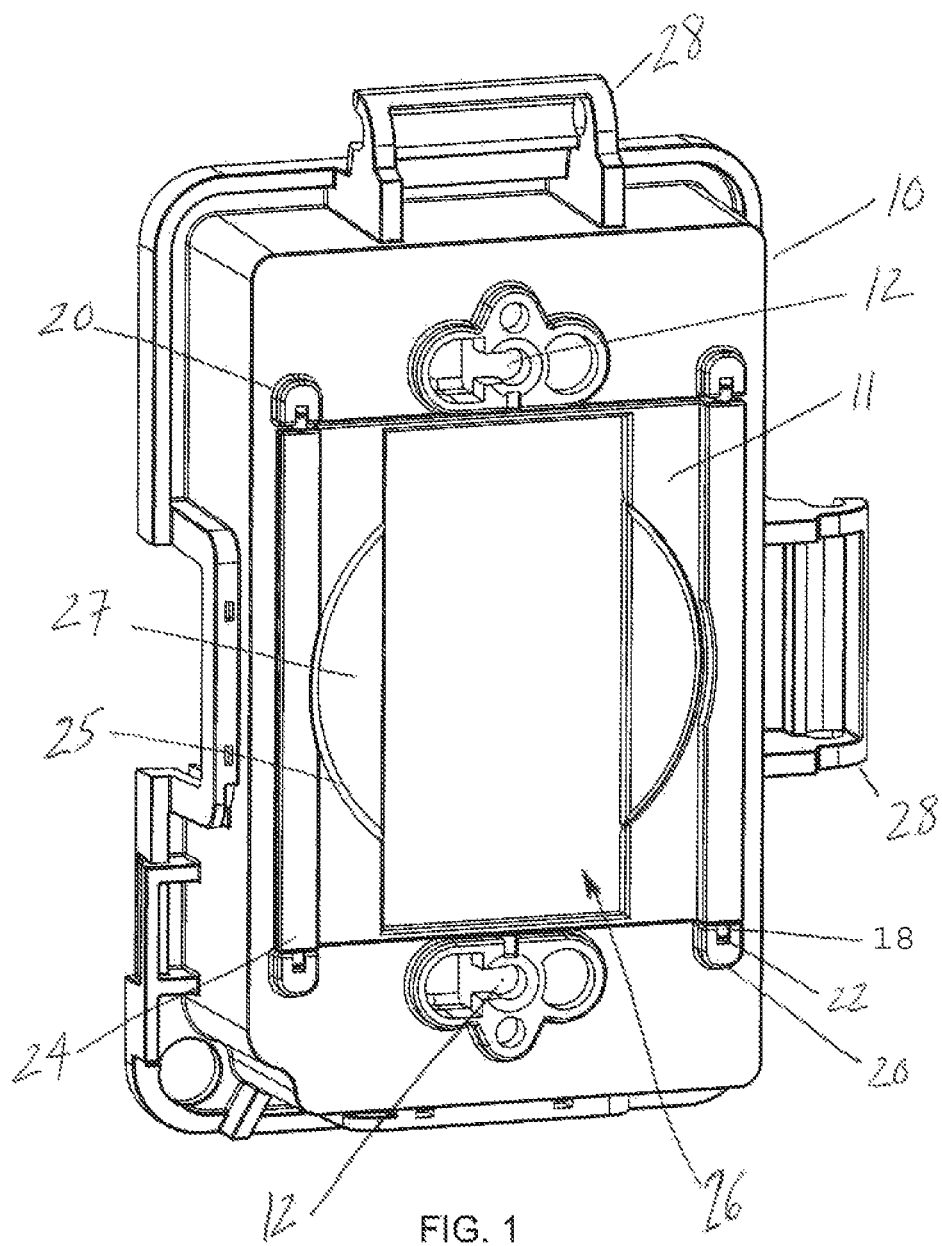
FIG. 1 is a perspective view of an electrical device cover with keyholes and an adapter installed.
Figure 2:
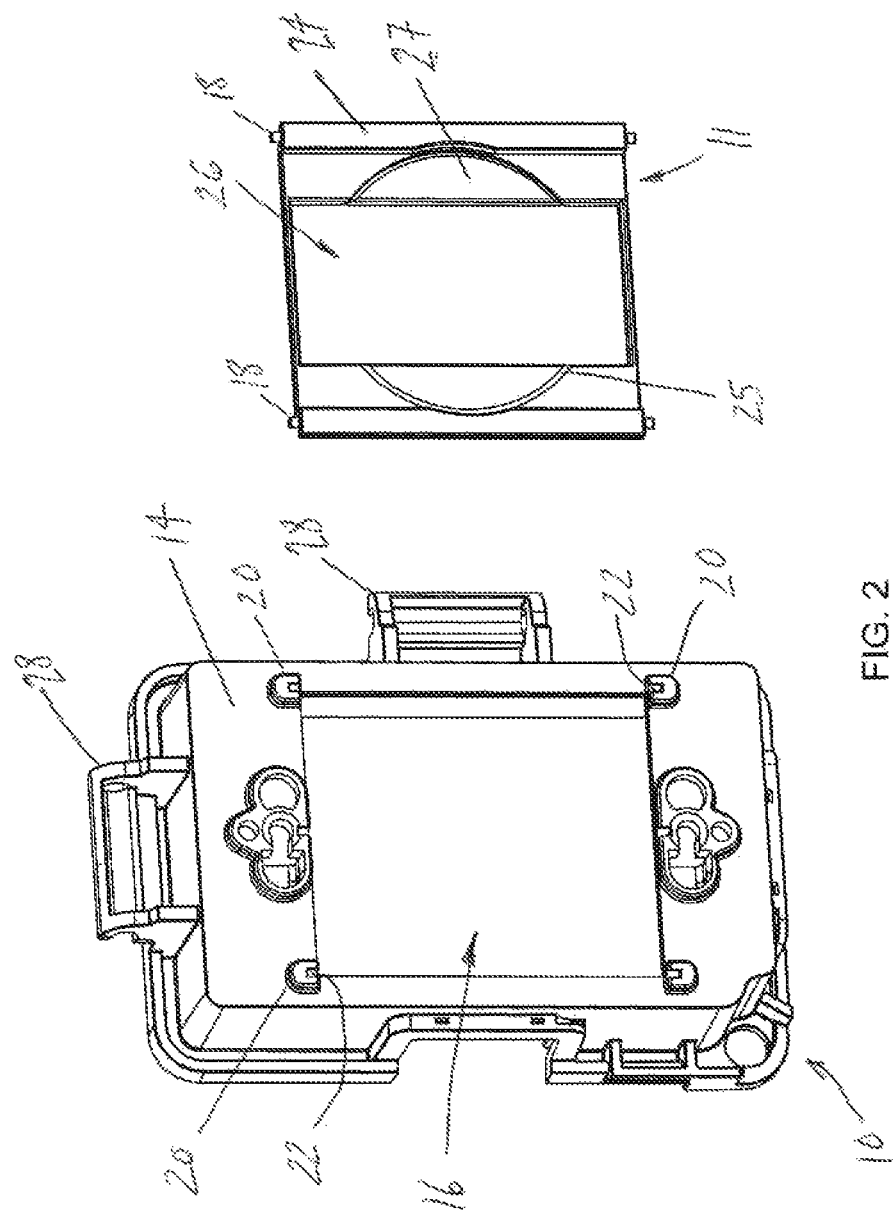
FIG. 2 is an exploded perspective view of the electrical device cover of FIG. 1.

FIGS. 1 and 2 illustrate a first aspect of a base 10 and an adapter 11 for an electrical device cover with keyholes. The base 10 also includes a pair of keyholes 12. Keyholes 12 each have a portion sized to receive a head of mounting screw (not shown), and a portion sized so that a head of a mounting screw does not fit through it. Keyholes, as a term, are known in the art. In a particular implementation, the portion sized to receive the head of the mounting screw comprises an alignment aperture, and the portion sized such that the head of the mounting screw does not fit through it comprises a mounting aperture, as described in relation to FIGS. 5-14.

A keyhole cover may extend outwardly from a front surface opposite the back surface 14, and cover the portion of the keyhole sized to receive the head of the mounting screw. FIGS. 5-14 illustrate various front views of different implementations of an electrical device cover, including various implementations of a keyhole cover. Any of the keyhole covers illustrated in FIGS. 5-14 may be modified for use with the base 10. In a particular aspect, the keyhole cover may extend far enough from the front surface to allow the head of a mounting screw to fit between the keyhole surface and a plane formed by the front surface.

Referring to FIG. 2, the base 10 also includes a back surface 14 with an opening 16 extending through the base 10. As can be seen, the opening 16 is arranged to receive the adapter 11 therein, but the opening 16 is of such a size that an electrical device would not snugly fit within the opening 16 as the gap around the electrical device would be too large.

In this implementation, the adapter 11 may connect to the back surface 14 of the base 10. The adapter 11 has a plurality of tabs 18, one mounted on each corner of the adapter 11. The back surface 14 of the base 10 may also include a plurality of receiving nodes 20 located at each corner of the opening 16. Each node 20 may include a slot 22. Each tab 18 on the adapter 11 couples with each respective slot 22 on node 20 in the base 10 to connect the adapter 11 to the back surface 14 of the base 10.

The particular adapter 11 shown in FIGS. 1 and 2 also may include a ridge 24 to increase the rigidity of the adapter 11. When installed, the ridges 24 abut the nodes 20 to further increase the strength of the combined base 10 and adapter 11. Further, the adapter 11 may include an opening 26 sized to accommodate a rectangular electrical device. The opening 26 is sized large enough to receive an electrical socket face therein.

Still further, the adapter 11 may include rounded removable portions 27, which when removed, are sized to accommodate a round electrical device. The rounded removable portions 27 are preferably solid but configured so that they may be easily broken and removed. A user may remove the rounded removable portions 27 by snapping the rounded removable portions 27 from the adapter 11 along a channel 25 formed in the adapter 11 at the periphery of the rounded removable portions 27. The channel 25 may be a thinned portion of the adapter 11 or a score line in the adapter 11.

A hinge 28 may extend from any of the side walls of the base 10 so that a hinge is located on one, two, three, or four sides of the base 10 without departing from the spirit and scope of the disclosure. A lid (not shown) may pivotably couple to the hinge 28 to restrict water and other undesirable materials from contacting the electrical device and also permits the user access to the electrical device. U.S. Pat. No. 7,538,272, which relates to an electrical device cover, is hereby incorporated by reference into this application for its disclosure of a lid hingedly coupled to a base for a cover assembly of a while in-use electrical outlet cover. The electrical device and base 10 could be mounted horizontally or vertically as desired by selecting a lid to couple to the appropriate hinge 28 on the base 10.

Figure 3:
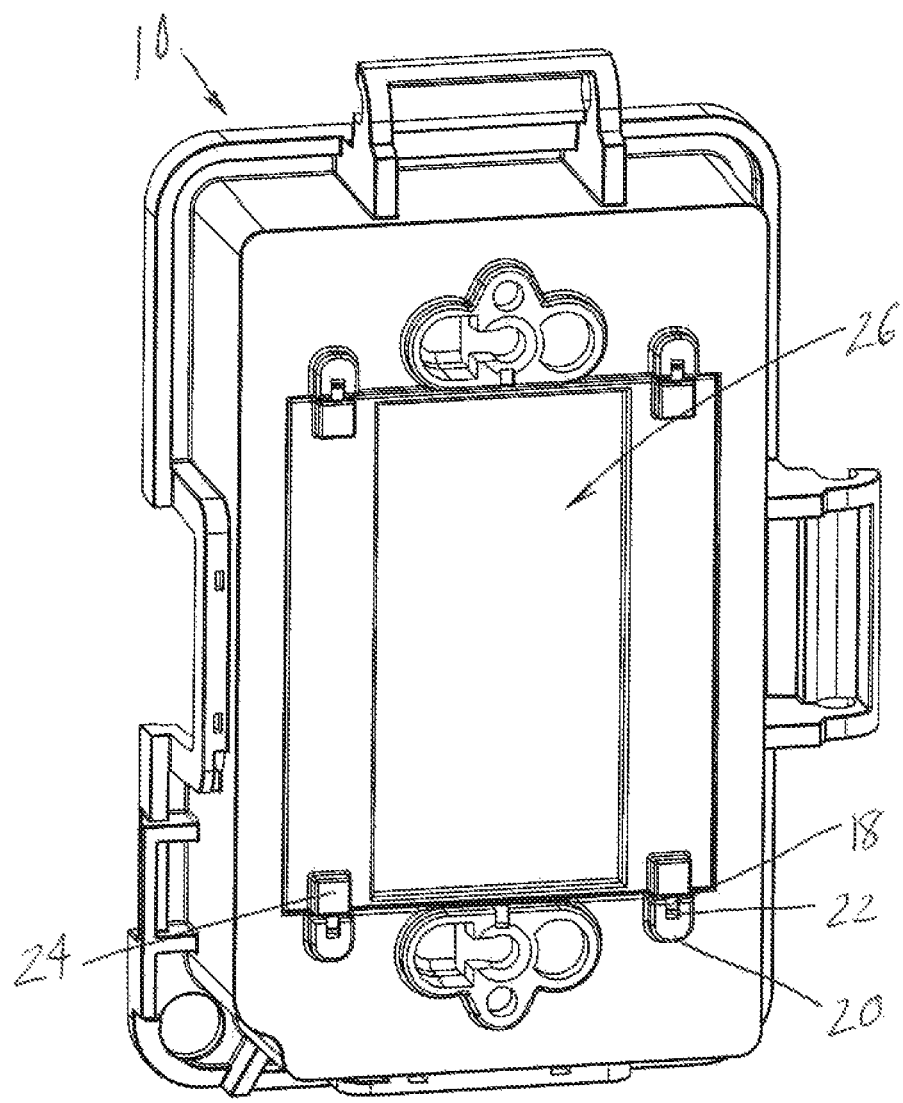
FIG. 3 is a perspective view of another electrical device cover with keyholes and an adapter installed.

FIGS. 3 and 4 illustrate a second aspect of base 10 and adapter 11 for an electrical device cover's base assembly with keyholes in the base or adapter. Specifically, FIGS. 3 and 4 are similar to FIGS. 1 and 2, except that the adapter 11 does not have rounded removable portions 27 to receive a round-shaped socket face of an electrical device. The adapter 11 of FIGS. 3 and 4 also differs from that on FIGS. 1 and 2 in that the ridge 24 does not extend along the full length of the adapter 11. However, the length of the ridge 24 may extend the full length of the adapter 11, if desired. All other features are the same as disclosed above with respect to FIGS. 1 and 2.

Figure 5:
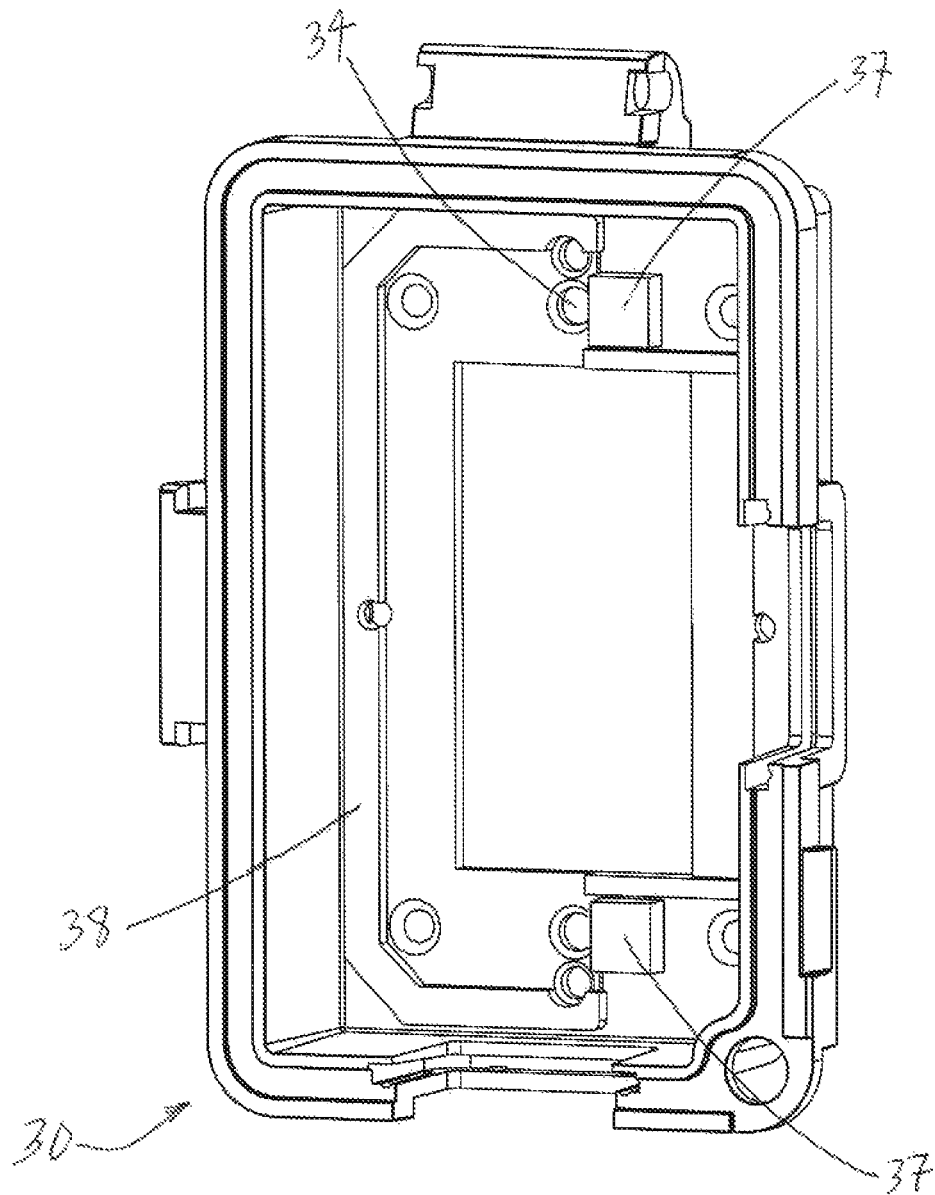
FIG. 5 is a perspective view of yet another electrical device cover with keyholes and an adapter installed.
Figure 6:
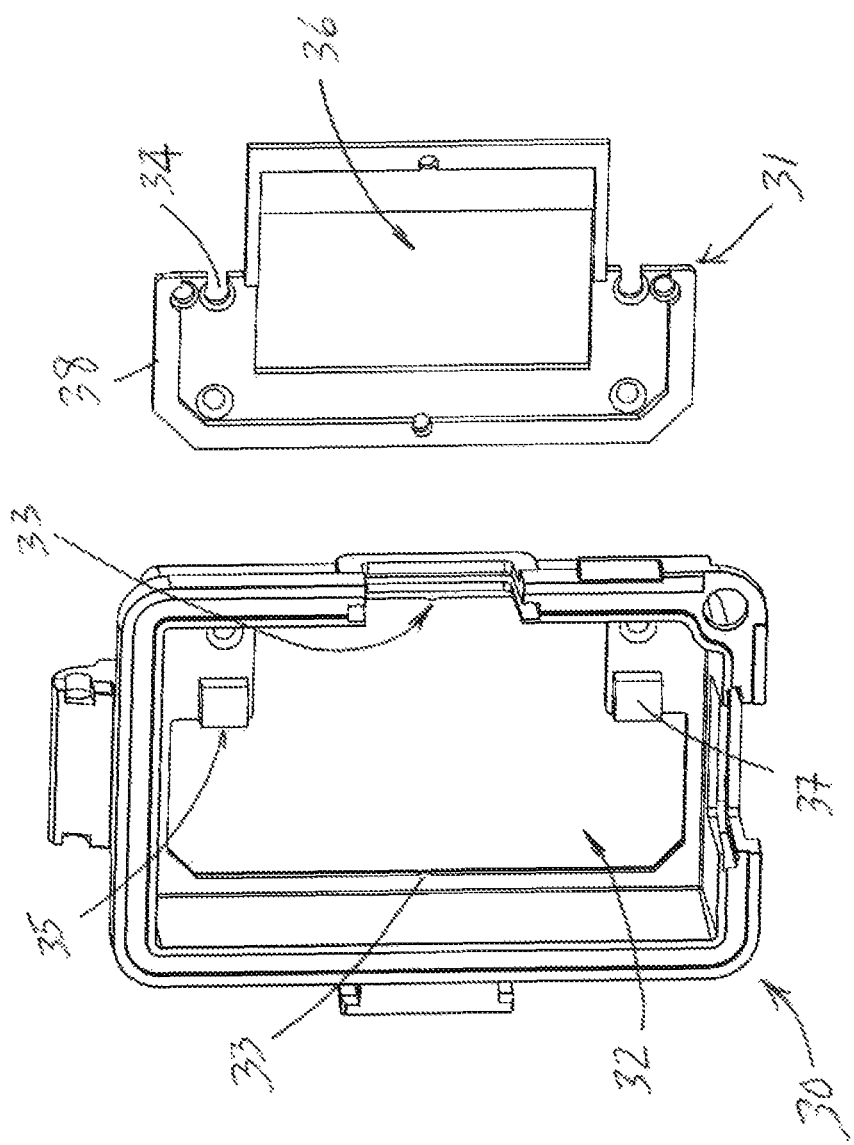
FIG. 6 is an exploded perspective view of the electrical device cover of FIG. 5.

FIGS. 5 and 6 illustrate a perspective view and an exploded view of an electrical device cover's base with keyholes having another aspect base 30 and another aspect of a corresponding adapter 31 positioned within an opening 32 of the base 30. The opening 32 is arranged to receive the adapter 31 but not an electrical device because the relatively large size of the opening 32 would create gaps around the electrical device.

The adapter 31 may be held in place in the opening 32 of the base 30 by at least one protrusion 33 extending into the opening 32. FIG. 6 shows a pair of protrusions 33 formed on opposite sides of the opening 32 of the base 30. When the adapter 31 is inserted into the opening 32 of the base 30, the protrusions 33 form a friction fit with the adapter 31 to hold it in place and also permit it to be removable.

In FIGS. 5 and 6, the adapter 31 includes a mounting aperture 34 for the keyhole, while the base 30 includes an alignment aperture 35. The alignment aperture 35 may, in a particular implementation, comprise a shape or configuration similar to the portion of the keyhole sized to receive the head of the mounting screw, shown in FIGS. 1-4. Thus, in order to create a full keyhole system with the mounting aperture 34 and the alignment aperture 35, both the adapter 31 and the base 30 must be used in combination with the mounting aperture 34 and the alignment aperture 35 aligned to form a keyhole.

Still further, the base 30 of FIGS. 5 and 6 may include a keyhole cover 37 formed in or permanently mounted to the base 30 over the alignment aperture 35 of the keyhole. In a particular aspect, the keyhole cover 37 may extend far enough from the front surface to allow the head of a mounting screw to fit between the keyhole cover 37 and a plane formed by the front surface. Once installed, the mounting screw head advantageously blocks the mounting aperture 34, while the alignment aperture 35 is covered by keyhole cover 37.

Further, the adapter 31 may include a central opening 36 sized and arranged to accommodate a rectangular electrical device once the adapter 31 is combined with the base 30. The adapter 31 may also include a peripheral raised ridge 38 to give added rigidity to the adapter 31 separately and to the combination of the adapter 31 and base 30.

Figure 7:
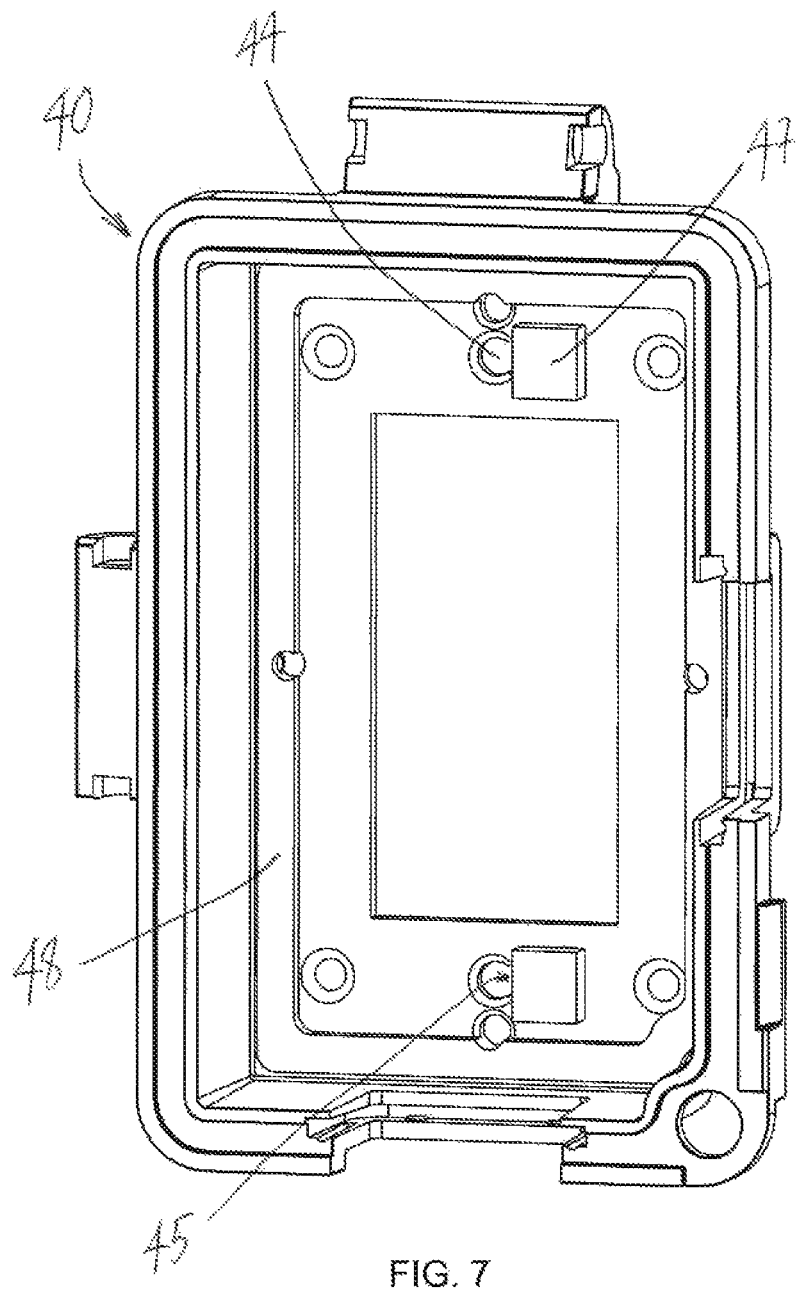
FIG. 7 is a perspective view of still yet another electrical device cover with keyholes and an adapter installed.
Figure 8:
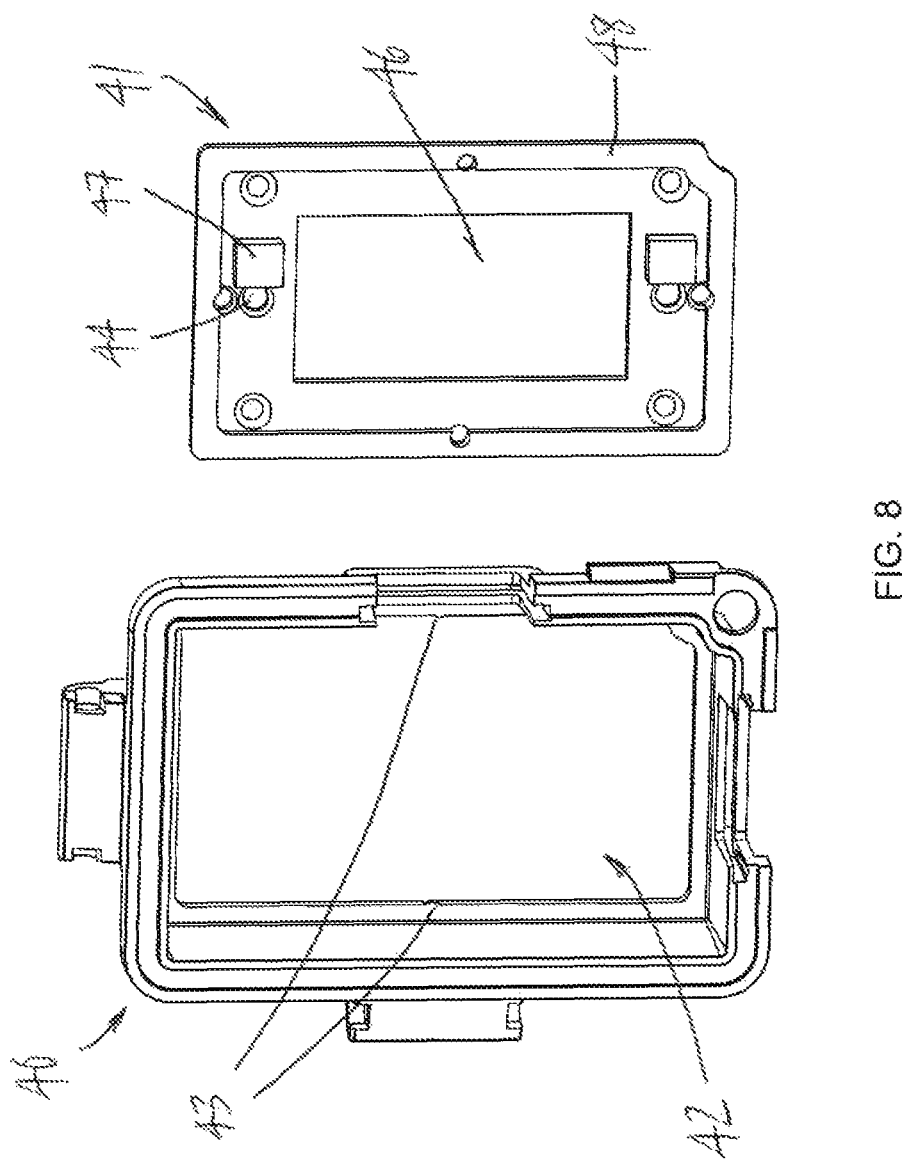
FIG. 8 is an exploded perspective view of the electrical device cover of FIG. 7.

FIGS. 7 and 8 illustrate a perspective view and an exploded view of an electrical device cover's base assembly with keyholes having still another aspect base 40 and corresponding adapter 41 positioned within an opening 42 of the base 40. The opening 42 is sized and arranged to receive the adapter 41 but not an electrical device because the relatively large size of the opening 42 would create gaps around the electrical device.

In FIGS. 7 and 8, the adapter 41 has both keyhole components. The adapter 41 includes a mounting aperture 44 for the keyhole and an alignment aperture 45. The alignment aperture 45 may, in a particular implementation, comprise a shape or configuration similar to the portion of the keyhole sized to receive the head of the mounting screw, shown in FIGS. 1-4. The adapter 41 fits into position in the opening 42 at the widest and longest positions within the base 40. Further, the adapter 41 includes a central opening 46 sized and arranged to accommodate a rectangular electrical device once the adapter 41 is combined with the base 40. The adapter 41 may also include a peripheral raised ridge 48 to give added rigidity to the adapter 41 separately and to the combination of the adapter 41 and base 40.

Still further, the adapter 41 of FIGS. 7 and 8 may include a keyhole cover 47 formed in or permanently mounted to the adapter 41 over the alignment aperture 45 of the keyhole. In a particular aspect, the keyhole cover 47 may extend far enough from the front surface to allow the head of a mounting screw to fit between the keyhole cover 47 and a plane formed by the front surface. Once installed, the mounting screw head advantageously blocks the mounting aperture 44, while the alignment aperture 45 is covered by keyhole cover 47.

The adapter 41 may be held in place in the opening 42 of the base 40 by at least one protrusion 43 extending into the opening 42. FIG. 8 shows a pair of protrusions 43 formed on opposite sides of the opening 42 of the base 40. When the adapter 41 is inserted into the opening 42 of the base 40, the protrusions 43 form a friction fit with the adapter 41 to hold it in place and also permit it to be removable.

Figure 9:
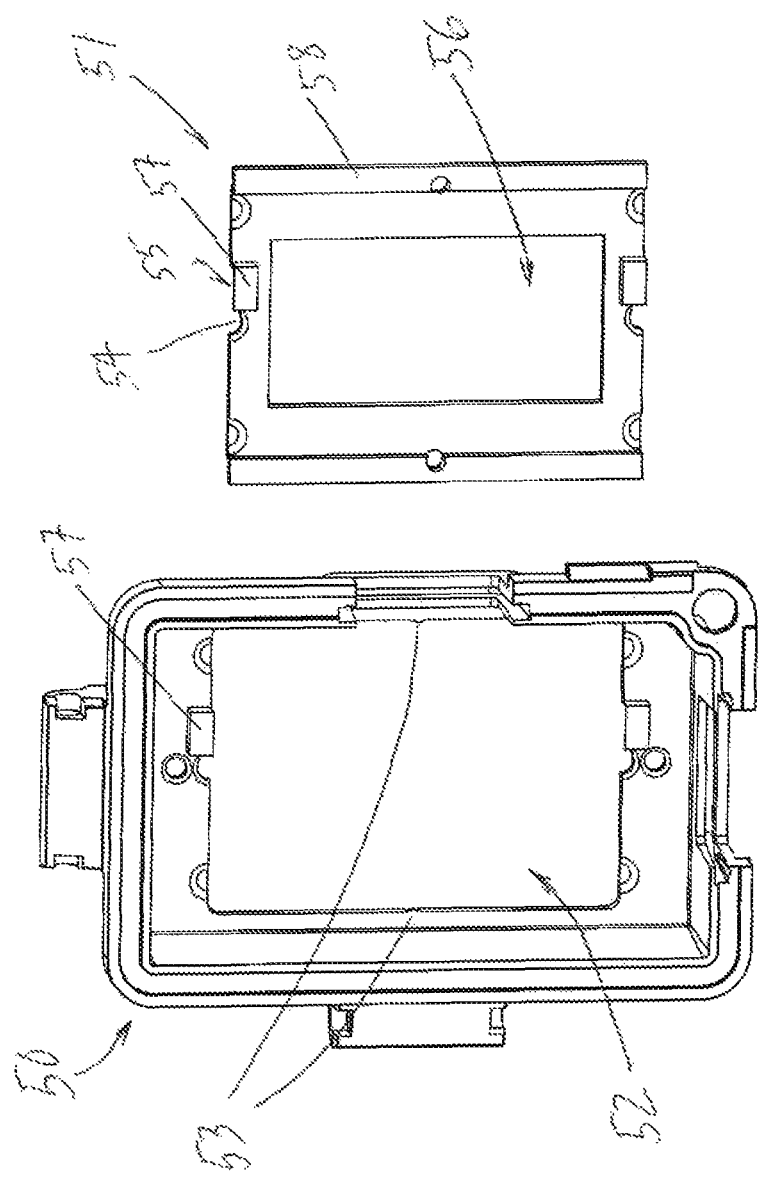
FIG. 9 is an exploded perspective view of another embodiment electrical device cover with keyholes and an adapter.
Figure 10:
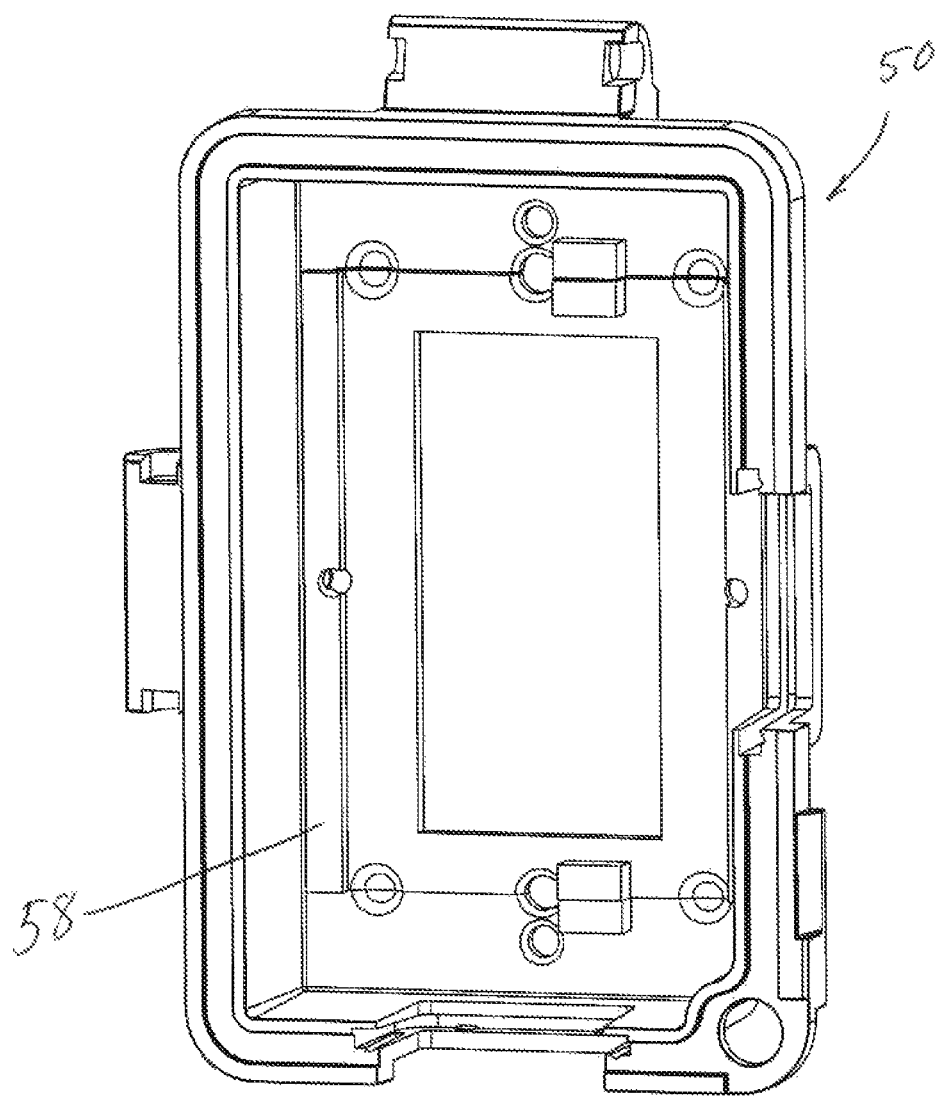
FIG. 10 is a perspective view of the electrical device cover of FIG. 9.

FIGS. 9 and 10 illustrate a perspective view and an exploded view of an electrical device cover's base with keyholes having yet another aspect base 50 and corresponding adapter 51 positioned within an opening 52 of the base 50. The opening 52 is arranged to receive the adapter 51 but not an electrical device because the relatively large size of the opening 52 would create gaps around the electrical device.

In this aspect, the keyhole is split horizontally and neither the base 50 nor the adapter 51 includes a keyhole therein. It is only when the base 50 and the adapter 51 are combined that a keyhole is fully formed therein. Further, the adapter 51 may include a central opening 56 sized and arranged to accommodate a rectangular electrical device once the adapter 51 is combined with the base 50.

Still further, the base 50 of FIGS. 9 and 10 may include a keyhole cover 57 formed in or permanently mounted to the base 50 over the alignment aperture 55 of the keyhole. In a particular aspect, the keyhole cover 57 may extend far enough from the front surface to allow the head of a mounting screw to fit between the keyhole cover 57 and a plane formed by the front surface. Once installed, the mounting screw head advantageously blocks the mounting aperture 54, while the alignment aperture 55 is covered by keyhole cover 57.

The adapter 51 may be held in place in the opening 52 of the base 50 by at least one protrusion 53 extending into the opening 52. FIG. 9 shows a pair of protrusions 53 formed on opposite sides of the opening 52 of the base 50. When the adapter 51 is inserted into the opening 52 of the base 50, the protrusions 53 form a friction fit with the adapter 51 to hold it in place and also permit it to be removable.

Further, the adapter 51 may include an opening 56 sized to accommodate a rectangular electrical device. The opening 56 is sized large enough to receive an electrical socket face therein. The adapter 51 may also include a peripheral raised ridge 58 to give added rigidity to the adapter 51 separately and to the combination of the adapter 51 and base 50.

Figure 11:
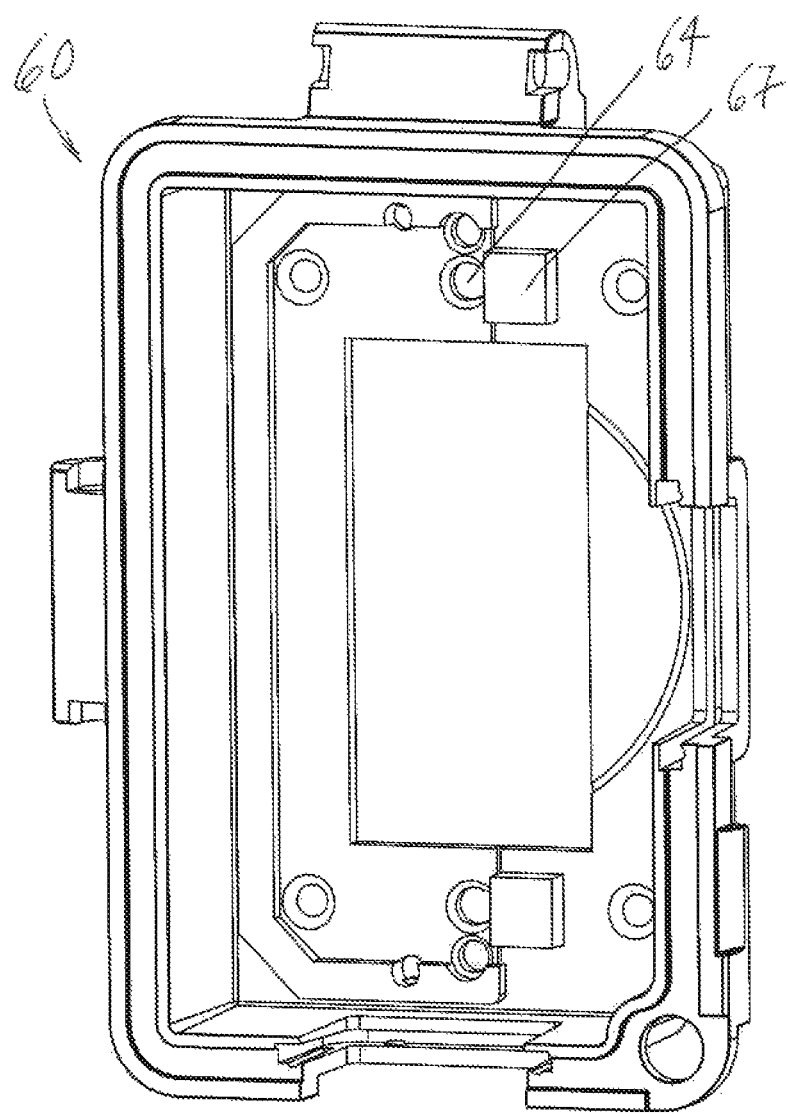
FIG. 11 is a perspective view of yet another embodiment electrical device cover with keyholes and an adapter installed.
Figure 12:
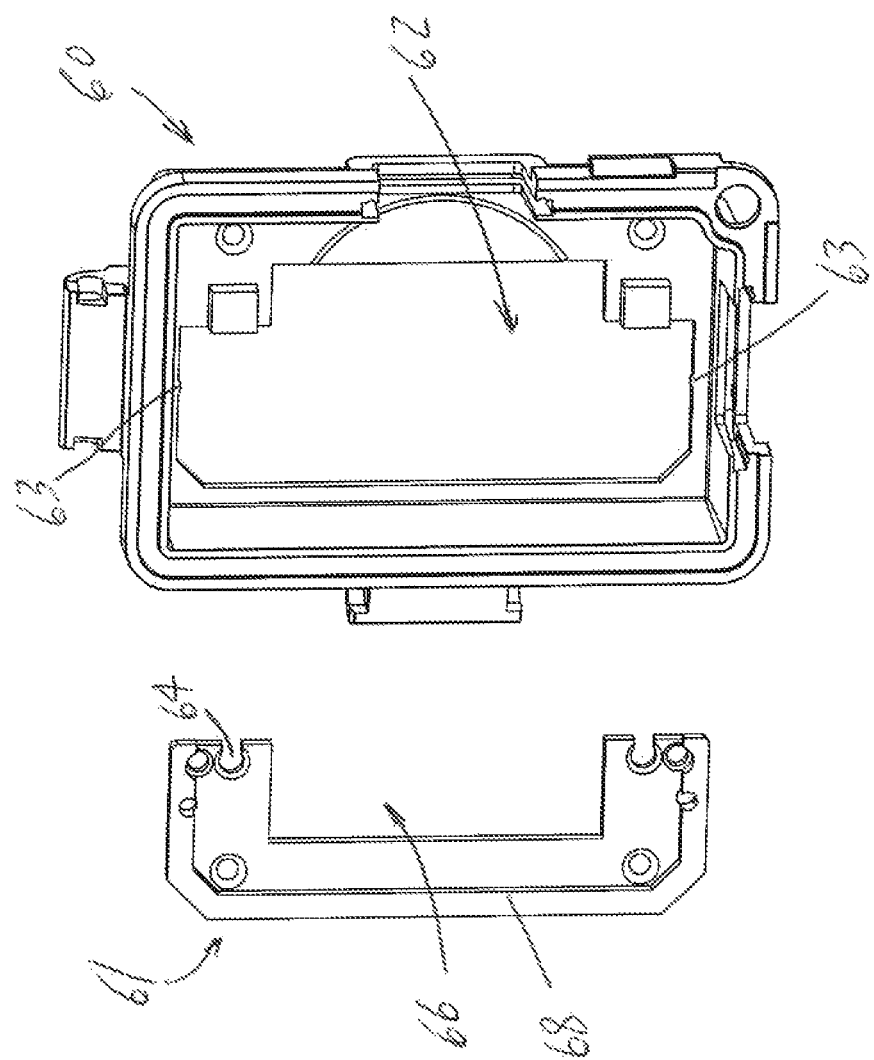
FIG. 12 is an exploded perspective view of the electrical device cover of FIG. 11.

FIGS. 11 and 12 illustrate yet another aspect base 60 having a keyhole cover 72 with an illustrate a perspective view and an exploded view of an electrical device cover with keyholes having yet another aspect base 60 and a corresponding adapter 61 positioned within an opening 62 of the base 60. In a particular aspect, the keyhole cover 72 may extend far enough from the front surface to allow the head of a mounting screw to fit between the keyhole cover 72 and a plane formed by the front surface. The opening 62 is arranged to receive the adapter 61 but not an electrical device because the relatively large size of the opening 62 would create gaps around the electrical device.

In FIGS. 11 and 12, the adapter 61 includes a mounting aperture 64 for the keyhole, while the base 60 includes an alignment aperture 65. The alignment aperture 65 may, in a particular implementation, comprise a shape or configuration similar to the portion of the keyhole sized to receive the head of the mounting screw, shown in FIGS. 1-4. Thus, in order to create a full keyhole system with the mounting aperture 64 and the alignment aperture 65, both the adapter 61 and the base 60 must be used in combination.

Further, the adapter 61 includes a central opening 66 sized and arranged to accommodate a rectangular electrical device once the adapter 61 is combined with the base 60. Similar to the aspect shown in FIGS. 5 and 6, the only difference is the size and shape of the opening 62 in the base 60 and the central opening 66 created by the adapter 61. In this aspect, the opening 62 in the base 60 is arranged to receive half of a decorator electrical device or GFCI device and the adapter 61 includes only the other half portion and a keyhole mounting aperture 64.

Still further, the base 60 of FIGS. 11 and 12 may include a keyhole cover 67 permanently mounted to the base 60 over the alignment aperture 65 of the keyhole. In a particular aspect, the keyhole cover 67 may extend far enough from the front surface to allow the head of a mounting screw to fit between the keyhole cover 72 and a plane formed by the front surface. Once installed, the mounting screw head advantageously blocks the mounting aperture 64, while the alignment aperture 65 is covered by keyhole cover 67.

The adapter 61 may be held in place in the opening 62 of the base 60 by at least one protrusion 63 extending into the opening 62. FIG. 12 shows a pair of protrusions 63 formed on opposite sides of the opening 62 of the base 60. When the adapter 61 is inserted into the opening 62 of the base 60, the protrusions 63 form a friction fit with the adapter 61 to hold it in place and also permit it to be removable.

Further, the adapter 61 may include an opening 66 sized to accommodate a portion of a rectangular electrical device. The opening 66 is sized large enough to receive a portion of an electrical socket face therein. The adapter 61 may also include a peripheral raised ridge 68 to give added rigidity to the adapter 61 separately and to the combination of the adapter 61 and base 60.

Figure 13:
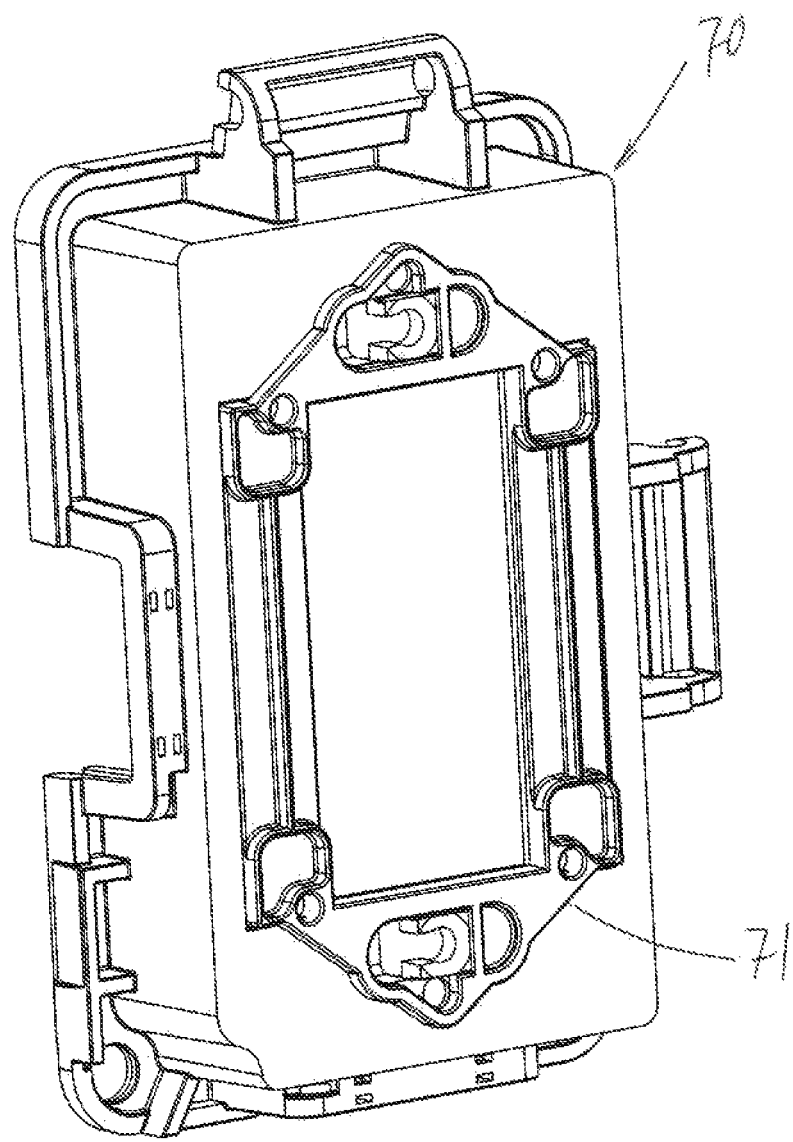
FIG. 13 is a perspective view of still yet another embodiment electrical device cover with keyholes and an adapter installed.

FIGS. 13 and 14 illustrate a perspective view and an exploded view of an electrical device cover's base assembly with keyholes having yet another aspect base 70 and corresponding adapter 71 positioned within an opening 72 of the base 70. The opening 72 is arranged to receive the adapter 71 but not an electrical device because the relatively large size of the opening 72 would create gaps around the electrical device.

The adapter 71 may be held in place in the opening 72 of the base 70 by at least one protrusion 73 extending into the opening 72. FIG. 14 shows a pair of protrusions 73 formed on each of the opposing sides of the opening 72 of the base 70. When the adapter 71 is inserted into the opening 72 of the base 70, the protrusions 73 form a friction fit with the adapter 71 to hold it in place and also permit it to be removable.

Further, the adapter 71 includes a central opening 76 sized and arranged to accommodate a rectangular electrical device once the adapter 71 is combined with the base 70. Still further, the base 70 of FIGS. 13 and 14 may include a keyhole cover 77 permanently mounted to the base 70 over the alignment aperture 75 of the keyhole. In a particular aspect, the keyhole cover 77 may extend far enough from the front surface to allow the head of a mounting screw to fit between the keyhole cover 72 and a plane formed by the front surface. Once installed, the mounting screw head advantageously blocks the mounting aperture 74, while the alignment aperture 75 is covered by keyhole cover 77. The alignment aperture 75 may, in a particular implementation, comprise a shape or configuration similar to the portion of the keyhole sized to receive the head of the mounting screw, shown in FIGS. 1-4.

The adapter 71 may include a pair of openings 78, each opening 78 surrounds a respective keyhole in the base 71. These openings 78 eliminate the need for keyholes in the adapter 71, but provide the functionality of having a keyhole in the adapter 71. Still further, the openings 78 help to ensure alignment during the installation process.

In these and in any other aspects, the electrical device cover may be made of any materials and fabricated and/or assembled in any manner. For instance the electrical device cover may be manufactured from various different pieces and then screwed or glued together. The various elements, such as portions of the electrical device cover may be manufactured as one piece or may be manufactured as separate pieces to be joined together.

It will be understood that implementations are not limited to the specific components disclosed herein, as virtually any components consistent with the intended operation of a method and/or system implementation for an electrical device cover may be utilized. Accordingly, for example, although particular bodies, arms, springs, and other components are disclosed, such components may comprise any shape, size, style, type, model, version, class, grade, measurement, concentration, material, weight, quantity, and/or the like consistent with the intended operation of a method and/or system implementation for an electrical device cover. Implementations are not limited to uses of any specific components, provided that the components selected are consistent with the intended operation of a method and/or system implementation for electrical device cover.

Accordingly, the components defining any electrical device cover may be formed of any of many different types of materials or combinations thereof that can readily be formed into shaped objects provided that the components selected are consistent with the intended operation of an electrical device cover implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any electrical device cover implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld (e.g. an ultrasonic weld), a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The implementations listed here, and many others, will become readily apparent from this disclosure. From this, those of ordinary skill in the art will readily understand the versatility with which this disclosure may be applied.

The invention claimed is:

1. A cover base for an electrical device, the cover base comprising:
    a base portion having a front surface and a back surface, the base portion further comprising a first opening extending through the base portion from the front surface to the back surface, the first opening having a size larger than an electrical device face;
    an adapter having a second opening sized and configured to receive the electrical device face therein, wherein the adapter is configured to fit within the first opening in the base portion to removably couple to the base portion;
    a keyhole opening through at least one of the base portion and the adapter, the keyhole comprising an alignment aperture sized to receive a head of a mounting screw and a mounting aperture sized to prevent passage of the head through the mounting aperture;
    a keyhole cover permanently coupled to at least one of the front surface of the base and a front surface of the adapter, the keyhole cover covering the alignment aperture.

2. The cover base of claim 1, wherein the base portion further comprises at least one node having a slot located on the back surface of the base portion and wherein the adapter further comprises at least one tab configured to respectively couple with the slot on the base portion.

3. The cover base of claim 1, wherein the adapter further comprises a detachable portion.

4. The cover base of claim 3, wherein the detachable portion is shaped when detached to create a shaped aperture configured to receive a correspondingly shaped electrical device.

5. The cover base of claim 1, wherein the base portion is a single molded piece.

6. The cover base of claim 1, wherein the base portion further comprises a first peripheral side of the base portion having at least one hinge member thereon.

7. The cover base of claim 1, wherein the base portion is composed of a rigid plastic.

8. The cover base of claim 1, wherein the adapter is composed of a rigid plastic.

9. The cover base of claim 1, wherein the keyhole opening is through the base and the keyhole cover is permanently coupled to the front surface of the base.

10. The cover base of claim 1, wherein the mounting aperture of the keyhole opening is through the adapter, the alignment aperture is through the base, and the keyhole cover is coupled to the base, wherein the mounting aperture and the alignment aperture are aligned to form the keyhole when the adapter is removable coupled to the base.

11. The cover base of claim 1, wherein the keyhole opening is through the adapter and the keyhole cover is permanently coupled to the front surface of the adapter.

12. The cover base of claim 1, wherein a first portion of the mounting aperture is through the adapter, a second portion of the mounting aperture is through the base, a first portion of the alignment aperture is through the adapter, a second portion of the alignment aperture is through the base, a first portion of the keyhole cover is coupled to the mounting aperture, and a second portion of the keyhole cover is coupled to the base, wherein the first and second portions of the mounting aperture and the first and second portions of the alignment aperture align to form the keyhole when the adapter is removably coupled to base.

13. The cover base of claim 12, wherein the first and second portions of the mounting aperture and the first and second portions of the alignment aperture align horizontally to form the keyhole.

14. The cover base of claim 12, wherein the first and second portions of the mounting aperture and the first and second portions of the alignment aperture align vertically to form the keyhole.

15. The cover base of claim 1 wherein the base portion further comprises at least one protrusion extending into the first opening.

16. The cover base of claim 1, wherein said keyhole cover has a top portion spaced from said base or said adapter a distance to allow a screw head to slide into said alignment aperture, and where said mounting aperture is accessible from a front side of said cover base.

17. A cover base for an electrical device, the cover base comprising:
    a base portion having a front surface and a back surface, the base portion further comprising a first opening extending through the base portion from the front surface to the back surface, the opening having a size larger than an electrical device face;
    an adapter having a second opening sized and configured to receive a portion of the electrical device face therein, wherein the adapter is configured to fit within the opening in the base portion to removably couple to the base portion and wherein the first opening of the base portion the second opening of the adapter and form a third opening sized and configured to receive the electrical device face therein; and a keyhole opening through at least one of the base portion and the adapter, the keyhole comprising an alignment aperture sized to receive a head of a mounting screw and a mounting aperture sized to prevent passage of the head through the mounting aperture;

a keyhole cover permanently coupled to at least one of the front surface of the base and a front surface of the adapter, the keyhole cover covering the alignment aperture.

18. The cover base of claim 17, wherein said keyhole cover has a top portion spaced from said base or said adapter a distance to allow a screw head to slide into said alignment aperture, and where said mounting aperture is accessible from a front side of said cover base.

19. A method of forming a cover base for an electrical device, the method comprising:

providing a base portion having a front surface and a back surface, the base portion further comprising a first opening extending through the base portion from the front surface to the back surface, the opening having a size larger than an electrical device face;

providing an adapter having a second opening sized and configured to receive a portion of the electrical device face therein, positioning the adapter to fit within the first opening in the base portion;

removably coupling the adapter to the base portion; and providing a keyhole covering permanently covering an alignment aperture of a keyhole in at least one of the base and the adapter.

20. The method of claim 19, further comprising forming a third opening with the first opening of the base portion the second opening of the adapter wherein the third opening is sized and configured to receive the electrical device face therein.

21. The method of claim 20, wherein the adapter further comprises an extended portion, the method further comprising removably coupling the extended portion to the back surface of the base portion.

22. A cover base for an electrical device, the cover base comprising:

a base portion having a front surface and a back surface, the base portion further comprising a first opening extending through the base portion from the front surface to the back surface, the first opening having a size larger than an electrical device face;

an adapter having a second opening sized and configured to receive the electrical device face therein, wherein the adapter is configured to fit within the first opening in the base portion to removably couple to the base portion;

a keyhole opening through said cover base, the keyhole comprising an alignment aperture sized to receive a head of a mounting screw and a mounting aperture sized to prevent passage of the head through the mounting aperture, said mounting aperture being formed in one of said adapter and said base, and said alignment aperture is formed in the other of said adapter and base, where said mounting aperture and alignment aperture are aligned to form said keyhole when said adapter is coupled to said base.

23. The cover base of claim 22, wherein said mounting aperture is formed in said adapter, and said alignment aperture is formed in said base.

24. The cover base of claim 23, further comprising
a keyhole cover covering said alignment hole and permanently coupled to said base, and where said mounting aperture is accessible from a front side of said cover base.

25. The cover base of claim 22, wherein said mounting aperture is formed in said base, and said alignment aperture is formed in said adapter.

26. The cover base of claim 25, further comprising
a keyhole cover covering said alignment hole and permanently coupled to said adapter and said mounting aperture is accessible from a front side of said cover base.

* * * * *